J. B. SKINNER.
Wheel Cultivator.
No. 52,217.
Patented Jan. 23, 1866.
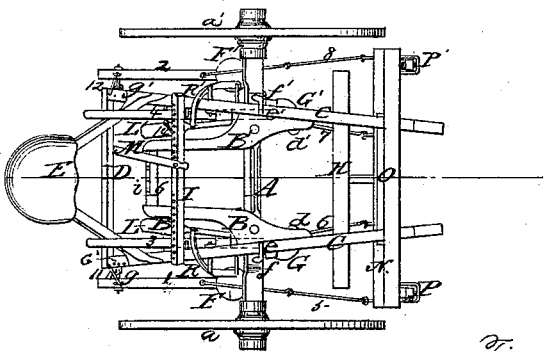
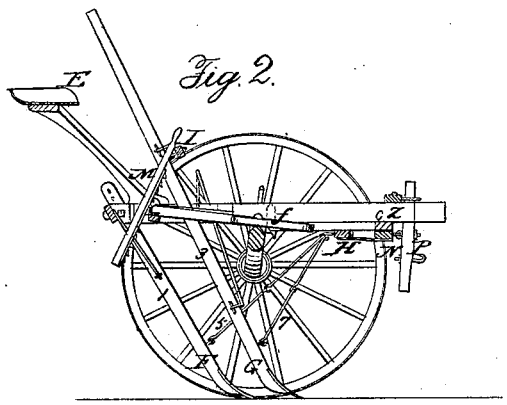
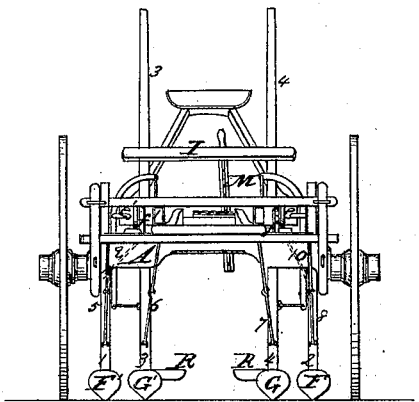
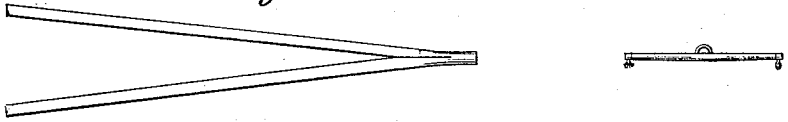
Witnesses:
J. J. Peyton
Theodore Lang
Inventor:
J. B. Skinner
By Baldwin & Son
Atty

UNITED STATES PATENT OFFICE.

JAMES B. SKINNER, OF ROCKFORD, ILLINOIS.

IMPROVEMENT IN CULTIVATORS.

Specification forming part of Letters Patent No. 52,217, dated January 23, 1866.

*To all whom it may concern:*

Be it known that I, J. B. SKINNER, of the city of Rockford, in the county of Winnebago and State of Illinois, have invented certain new and useful Improvements in Cultivators; and I do hereby declare that the following is a full, clear, and exact description of the construction and operation of the same, reference being had to the annexed drawings, making a part of this specification, in which—

Figure 1 is a plan view of my cultivator. Fig. 2 is a central longitudinal section. Fig. 3 is a front view of the same, and Fig. 4 is the tongue or continuation of the frame.

To operate perfectly in growing crops the cultivator should possess a skeleton-frame to permit the driver to see the ground before the plows, and be as light as possible, consistent with the required strength. The frame should be adjustable in a vertical direction to raise the plows out of the ground, when required, and regulate the depth of plowing. The plows should have a lateral as well as vertical adjustment, and also a pivotal motion to control the depth and line of furrow, as well as to throw more ground to either side of the plow, and these adjustments should be so arranged as at all times to be under the easy control of the driver, and, withal, the perfect cultivator must have, with light draft, an easy mode of equalizing the labor of the team. Now, it is the object of my invention to accomplish all these results in a simple manner and embody the required mechanism in a single machine; and to this end my invention consists, first, in making the frame of two pieces of light timber, which shall constitute the tongue, and taper from its forward end to behind the axle to support the plows and driver, and be so open that the driver can have a clear view of the ground from between the horses to the plows; second, in mounting the frame on a bent axle, so as to have vertical adjustability at the will of the driver, and be rendered rigid when elevated, that the axle may not turn under the frame; third, in an arrangement of levers under the control of the driver to move the plows sidewise while advancing, to vary the lines of plowing to the line of the growing crop; fourth, in supporting the plows on levers so hinged to the frame as to permit them to be raised and lowered with the frame, to be vibrated sidewise, and to have a pivotal movement to throw the earth in larger quantity to either side of the plows; fifth, in a device for holding the plows at any elevation desired, and keeping them rigid at the distance apart and in the position to which they may be adjusted; sixth, in combining with the plows adjustable wings to throw the earth in ridges to the crop when sufficiently matured to bear ridging; seventh, in attaching the team to single-trees hung on levers attached to the double-tree and braced against a rigid cross-bar on the main frame to equalize the draft upon the horses.

Like letters refer to like parts in all the figures of the drawings.

I mount a bent axle, A, on suitable wheels $a$ and $a'$, and attach securely to the top of the axle levers B and B', projecting in front of the axle to receive the frame, and in rear of the axle, where they are united by a cross-bar, $b$, that serves to hold their rear projecting ends securely in position, and enables both levers to be operated as one by the feet of the driver.

To the front ends of the levers B and B' the frame Z is pivoted. This frame consists of two pieces, C and C', of suitable strength to sustain the draft of the cultivator, with all its attachments in operation; and the frame-pieces are attached together at their front end, $c$, in Fig. 4, and spread apart at their rear ends, $c'$ and $c^2$ of Fig. 1, where they are united by a cross-brace, D; and they are fastened by bolts or studs $d$ and $d'$ to the levers B and B', so as to vibrate on the bolts or studs, or these may be rigid in the frame and loose in the levers to permit vertical vibration. At the outside of the frame-timbers straps or bent hooks $e$ and $e'$ are secured to the axle at their lower ends, and the hooks at their upper end turn over the frame to limit the distance the frame shall rise above the axle at its greatest height; and the frame carries notched brackets $f$ and $f'$, directly in front of the axle, that move on bolts or studs, and when the frame is raised to its full height the brackets are pushed the depth of the notch in upon the axle at their lower ends, and sustain the frame rigidly at the height necessary to raise the plows out of the ground, so that the cultivator can be moved from place to place without the plows touching the land over which they pass; and this mode of rendering the frame rigid at its greatest elevation will, it is obvious, prevent its tilting, or render it impossible for the axle to turn under the frame.

The driver's seat E is attached to the rear of the frame, and the rear plows, F and F', are attached to the outside of the frame, beneath the driver's seat, while the front plows, G and G', are attached to the inside of the frame-timbers a convenient distance in front of the driver. The plows are supported on beams or standards 1 2 3 4, hinged to the frame by loop-connections, of which two are shown for the rear plows in Fig. 1, that permit the standards to move laterally and turn to a limited distance, as on a pivot. These standards are held at the proper angle of inclination for working by link-rods 5 6 7 8, fastened at their lower ends to the standards, and at their upper ends to a brace-bar, H, attached to the under side of the frame, and, as these rods are held by nuts on the screws on which they terminate, it is obvious that the angle at which the standards shall work may be governed by drawing the link-rods more or less through the brace-bar H.

The standards of the rear plows, F and F', have brace-rods 9 and 10, (shown in dotted lines in Fig. 3,) that are secured at one end by a hook-and-staple connection to the standard, and by a bolt or screw at the other end to the brace D in rear of the frame, and thus these standards can be braced farther apart or closer together, as the character of the work may require, and will be free to move as on a pivot; but this motion is determined, and their position rendered rigid when properly adjusted, by brace-rods 11 and 12, which are fastened to the frame at one end and have a bend at right angles at the other, the bent portion fitting in any of the holes shown in the frame to secure the plows in the position desired.

The plows G and G', or the front ones, have long standards terminating in handles near the driver's seat. These standards are united to the main frame by link-connections, that permit them also a sidewise and pivotal motion, and they also have a pivotal or link connection with a cross-brace bar, I. These standards also carry hooked rods 13 and 14, like 11 and 12, that extend from the standards to holes in the brace-bar I, that fix the standards rigidly, when adjusted, to prevent any change of pivotal motion in the plows, but as the brace-rod moves with the standards from side to side it does not prevent any desired change of direction for the furrow to be made by the front plows.

The direction of the furrow of the front plows is under control of bent levers K and K', attached to the ouside of the frame for fulcrums, while their long arms are attached to the standards near the plows, and their short arms are curved over the top of the frame-pieces and connected by rods with foot-levers L and L'. Now, it is obvious that as the right foot of the driver depresses the right lever, the plows will be forced to the right, and vice versa. It is also proper to remark that the side movement of the front plows may be aided by the handles of the standards, and in light ground the hand of the driver would be sufficient; but it is deemed better to have the foot-lever in use, that the hands of the driver may be left free to control his team.

To raise and lower the plows, so as to regulate the depth of plowing, I attach a ratchet-bar, M, to the brace 1 on the standards of the front plows. This bar moves on the edge of the cross-brace b of the levers B and B', which has a metal catch-plate, i, on which the teeth of the ratchet-bar M rest. Now, as the plate i is depressed, it will raise the main frame, through the action of the levers B and B', and with it, of course, the plows will rise and the ratchet will hold the frame at the precise elevation of the tooth in connection with the plate i; but when the bar is released from the plate i the frame will descend to change the depth of plowing to any degree required.

To ridge the crop as maturing I attach a wing or mold-board, R, to the upper and inner edges of the front flanges, by a slotted support and set-screws, by which its position on the standard can be adapted to any size of ridge desired, for, of course, if set deeper it will throw more land to the crop, and if shallower less.

To equalize the draft of each horse and make both do an equal share of the labor, I place a double bar, N, on the under side of the cross-bar O attached to the lower side of the frame in front of the wheels, and each end of the double bar carries a lever, P or P', that has a hook at its lower end, to which the single-tree is attached, while the opposite ends of these levers pass through a guide secured on the edge of a rigid bar, Q, on the top of the frame. Now, it is evident that as one horse pulls harder than the other the lever to which his single-tree is attached will advance and bring an equal portion of the draft upon his mate.

To prevent breaking the cultivator when a rigid obstruction is encountered, I have invented a single-tree that will permit a wooden pin to break, or a weak hook to give, to release the team and prevent injury; but this I do not claim in this application, though I have shown it in the drawings.

What I claim as my invention, and desire to secure by Letters Patent, is—

1. The frame of a cultivator so constructed of two longitudinal pieces as to have its front constitute the tongue, while its rear extends behind the axle to support the driver's seat and plows, substantially as set forth.

2. Uniting the frame to the axle by levers arranged as described, in combination with the mechanism, substantially as described, for rendering the frame rigid when raised to its greatest height, for the purpose set forth.

3. The combination of the standards with the frame, the bent levers, and foot-levers, when arranged and operating substantially as and for the purpose set forth.

4. The combination of the standards with the frame, so that they shall be raised and lowered with it, and be capable of a sidewise and pivotal movement, and these with the mechanism, substantially as described, for locking the standards rigidly when adjusted, for the purpose set forth.

5. In combination with the standards 3 and 4, the cross-bar I, ratchet-bar M, and the catch-plate i, and the catch-hooks 13 and 14, arranged and operating as and for the purpose set forth.

6. The combination of the adjustable moldboards R with the standards and plows, substantially in the manner and for the purpose set forth.

7. The combination of the double-tree N with the main frame and with the levers P and P', arranged and operating substantially as described, for the purpose set forth.

In testimony whereof I have hereunto subscribed my name.

JAMES B. SKINNER.

Witnesses:
MARVIN H. SKINNER,
HENRY M. SKINNER.